(12) United States Patent
Zuo et al.

(10) Patent No.: US 8,442,337 B2
(45) Date of Patent: May 14, 2013

(54) ENCODING ADJUSTMENTS FOR ANIMATION CONTENT

(75) Inventors: Xiping Zuo, Kirkland, WA (US);
Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1543 days.

(21) Appl. No.: 11/787,945

(22) Filed: Apr. 18, 2007

(65) Prior Publication Data
US 2008/0260278 A1    Oct. 23, 2008

(51) Int. Cl.
*G06K 9/00* (2006.01)
*H03D 3/24* (2006.01)

(52) U.S. Cl.
USPC .................... 382/251; 375/240.03

(58) Field of Classification Search ............ 382/251; 375/240.01–240.29
See application file for complete search history.

(56) References Cited

U.S. PATENT DOCUMENTS

| | | |
|---|---|---|
| 762,026 A | 6/1904 | Connstein |
| 4,583,114 A | 4/1986 | Catros |
| 4,679,079 A | 7/1987 | Catros et al. |
| 4,774,574 A | 9/1988 | Daly et al. |
| 4,821,119 A | 4/1989 | Gharavi |
| 4,862,264 A | 8/1989 | Wells et al. |
| 4,965,830 A | 10/1990 | Barham et al. |
| 4,992,889 A | 2/1991 | Yamagami et al. |
| 5,072,295 A | 12/1991 | Murakami et al. |
| 5,128,758 A | 7/1992 | Azadegan et al. |
| 5,136,377 A | 8/1992 | Johnston et al. |
| 5,144,426 A | 9/1992 | Tanaka et al. |
| 5,146,324 A | 9/1992 | Miller et al. |
| 5,179,442 A | 1/1993 | Azadegan et al. |
| 5,237,410 A | 8/1993 | Inoue |
| 5,241,395 A | 8/1993 | Chen |
| 5,253,058 A | 10/1993 | Gharavi |
| 5,263,088 A | 11/1993 | Hazu et al. |
| 5,301,242 A | 4/1994 | Gonzales et al. |
| 5,303,058 A | 4/1994 | Fukuda et al. |

(Continued)

FOREIGN PATENT DOCUMENTS

| | | |
|---|---|---|
| CA | 1327074 | 2/1994 |
| EP | 0932306 | 7/1999 |

(Continued)

OTHER PUBLICATIONS

Atzori et al., "Adaptive Anisotropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).

(Continued)

*Primary Examiner* — Saleh Najjar
*Assistant Examiner* — Shu Chun Gao
(74) *Attorney, Agent, or Firm* — Klarquist Sparkman, LLP

(57) ABSTRACT

Techniques and tools are described for encoding animation video. In some embodiments, a video encoder designates animation video for encoding as animation content, which typically involves changing one or more encoder settings or rules to improve encoding performance for the animation content. When the encoder encodes the animation video, the encoder detects edges in the animation video using texture and changes settings for areas that include detected edges so as to improve encoding quality for the areas. In some embodiments, a video encoder adjusts differential quantization rules and quantizes animation video according to the adjusted differential quantization rules.

20 Claims, 7 Drawing Sheets

U.S. PATENT DOCUMENTS

| | | | |
|---|---|---|---|
| 5,317,396 A | 5/1994 | Fujinami |
| 5,317,672 A | 5/1994 | Crossman et al. |
| 5,333,212 A | 7/1994 | Ligtenberg |
| 5,351,310 A | 9/1994 | Califano et al. |
| 5,374,958 A | 12/1994 | Yanagihara |
| 5,412,429 A | 5/1995 | Glover |
| 5,452,104 A | 9/1995 | Lee |
| 5,461,421 A | 10/1995 | Moon |
| 5,473,377 A | 12/1995 | Kim |
| 5,481,553 A | 1/1996 | Suzuki et al. |
| 5,506,916 A | 4/1996 | Nishihara et al. |
| 5,510,785 A | 4/1996 | Segawa et al. |
| 5,537,440 A | 7/1996 | Eyuboglu et al. |
| 5,537,493 A | 7/1996 | Wilkinson |
| 5,539,469 A | 7/1996 | Jung |
| 5,559,557 A | 9/1996 | Kato |
| 5,565,920 A | 10/1996 | Lee et al. |
| 5,587,708 A | 12/1996 | Chiu |
| 5,590,139 A | 12/1996 | Suzuki et al. |
| 5,606,371 A | 2/1997 | Gunnewiek et al. |
| 5,623,424 A | 4/1997 | Azadegan et al. |
| 5,629,779 A | 5/1997 | Jeon |
| 5,631,644 A | 5/1997 | Katata et al. |
| 5,654,760 A | 8/1997 | Ohtsuki |
| 5,657,087 A | 8/1997 | Jeong et al. |
| 5,663,763 A | 9/1997 | Yagasaki et al. |
| 5,724,097 A | 3/1998 | Hibi et al. |
| 5,724,456 A | 3/1998 | Boyack et al. |
| 5,731,836 A | 3/1998 | Lee |
| 5,731,837 A | 3/1998 | Hurst, Jr. |
| 5,739,861 A | 4/1998 | Music |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,781,788 A | 7/1998 | Woo et al. |
| 5,786,856 A | 7/1998 | Hall et al. |
| 5,802,213 A | 9/1998 | Gardos |
| 5,809,178 A | 9/1998 | Anderson et al. |
| 5,815,097 A | 9/1998 | Schwartz et al. |
| 5,819,035 A | 10/1998 | Devaney et al. |
| 5,825,310 A | 10/1998 | Tsutsui |
| 5,835,145 A | 11/1998 | Ouyang et al. |
| 5,835,237 A | 11/1998 | Ebrahimi |
| 5,844,613 A | 12/1998 | Chaddha |
| 5,850,482 A | 12/1998 | Meany et al. |
| 5,867,167 A | 2/1999 | Deering |
| 5,870,435 A | 2/1999 | Choi et al. |
| 5,877,813 A | 3/1999 | Lee et al. |
| 5,878,166 A * | 3/1999 | Legall ............... 382/232 |
| 5,880,775 A | 3/1999 | Ross |
| 5,883,672 A | 3/1999 | Suzuki et al. |
| 5,926,791 A | 7/1999 | Ogata et al. |
| 5,969,764 A | 10/1999 | Sun et al. |
| 5,970,173 A | 10/1999 | Lee et al. |
| 5,990,957 A | 11/1999 | Ryoo |
| 6,044,115 A | 3/2000 | Horiike et al. |
| 6,049,630 A | 4/2000 | Wang et al. |
| 6,058,362 A | 5/2000 | Malvar |
| 6,072,831 A | 6/2000 | Chen |
| 6,084,636 A | 7/2000 | Fujiwara |
| 6,088,392 A | 7/2000 | Rosenberg |
| 6,091,777 A | 7/2000 | Guetz et al. |
| 6,104,751 A | 8/2000 | Artieri |
| 6,118,817 A | 9/2000 | Wang |
| 6,118,903 A | 9/2000 | Liu |
| 6,125,140 A | 9/2000 | Wilkinson |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,215,905 B1 | 4/2001 | Lee et al. |
| 6,223,162 B1 | 4/2001 | Chen et al. |
| 6,240,135 B1 | 5/2001 | Kim |
| 6,240,380 B1 | 5/2001 | Malvar |
| 6,243,497 B1 | 6/2001 | Chiang et al. |
| 6,249,614 B1 | 6/2001 | Bocharova et al. |
| 6,256,422 B1 | 7/2001 | Mitchell et al. |
| 6,256,423 B1 | 7/2001 | Krishnamurthy |
| 6,263,022 B1 | 7/2001 | Chen et al. |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,292,588 B1 | 9/2001 | Shen et al. |
| 6,314,208 B1 | 11/2001 | Konstantinides et al. |
| 6,337,881 B1 | 1/2002 | Chaddha |
| 6,347,116 B1 | 2/2002 | Haskell et al. |
| 6,348,945 B1 | 2/2002 | Hayakawa |
| 6,356,709 B1 | 3/2002 | Abe et al. |
| 6,359,928 B1 | 3/2002 | Wang et al. |
| 6,360,017 B1 | 3/2002 | Chiu et al. |
| 6,370,502 B1 | 4/2002 | Wu et al. |
| 6,373,894 B1 | 4/2002 | Florencio et al. |
| 6,385,343 B1 | 5/2002 | Kuroda et al. |
| 6,389,171 B1 | 5/2002 | Washington |
| 6,393,155 B1 | 5/2002 | Bright et al. |
| 6,408,026 B1 | 6/2002 | Tao |
| 6,418,166 B1 | 7/2002 | Wu et al. |
| 6,438,167 B1 | 8/2002 | Shimizu et al. |
| 6,456,744 B1 | 9/2002 | Lafe |
| 6,463,100 B1 | 10/2002 | Cho et al. |
| 6,466,620 B1 | 10/2002 | Lee |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,526,096 B2 | 2/2003 | Lainema et al. |
| 6,546,049 B1 | 4/2003 | Lee |
| 6,571,019 B1 | 5/2003 | Kim et al. |
| 6,593,925 B1 | 7/2003 | Hakura et al. |
| 6,600,836 B1 | 7/2003 | Thyagarajan et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,693,645 B2 * | 2/2004 | Bourges-Sevenier ......... 345/619 |
| 6,704,718 B2 | 3/2004 | Burges et al. |
| 6,721,359 B1 | 4/2004 | Bist et al. |
| 6,728,317 B1 | 4/2004 | Demos |
| 6,731,811 B1 | 5/2004 | Rose |
| 6,738,423 B1 | 5/2004 | Lainema et al. |
| 6,747,660 B1 | 6/2004 | Olano et al. |
| 6,759,999 B1 | 7/2004 | Doyen |
| 6,760,482 B1 | 7/2004 | Taubman |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,788,740 B1 | 9/2004 | Van der Schaar et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,807,317 B2 | 10/2004 | Mathew et al. |
| 6,810,083 B2 | 10/2004 | Chen et al. |
| 6,831,947 B2 | 12/2004 | Ribas Corbera |
| 6,862,320 B1 | 3/2005 | Isu et al. |
| 6,865,291 B1 | 3/2005 | Zador |
| 6,873,654 B1 | 3/2005 | Rackett |
| 6,876,703 B2 | 4/2005 | Ismaeil et al. |
| 6,882,753 B2 | 4/2005 | Chen et al. |
| 6,907,142 B2 | 6/2005 | Kalevo et al. |
| 6,909,745 B1 | 6/2005 | Puri et al. |
| 6,947,045 B1 | 9/2005 | Ostermann et al. |
| 6,975,680 B2 | 12/2005 | Demos |
| 6,977,659 B2 | 12/2005 | Dumitras et al. |
| 6,983,018 B1 | 1/2006 | Lin et al. |
| 6,990,242 B2 | 1/2006 | Malvar |
| 7,016,546 B2 | 3/2006 | Fukuhara et al. |
| 7,020,204 B2 | 3/2006 | Auvray et al. |
| 7,027,506 B2 | 4/2006 | Lee et al. |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |
| 7,099,389 B1 | 8/2006 | Yu et al. |
| 7,099,515 B2 | 8/2006 | Lin et al. |

| Patent/Publication | Date | Inventor(s) |
|---|---|---|
| 7,110,455 B2 | 9/2006 | Wu et al. |
| 7,162,096 B1 | 1/2007 | Horowitz |
| 7,200,277 B2 | 4/2007 | Joshi et al. |
| 7,280,700 B2 | 10/2007 | Tourapis et al. |
| 7,289,154 B2 | 10/2007 | Gindele |
| 7,295,609 B2 | 11/2007 | Sato et al. |
| 7,301,999 B2 | 11/2007 | Filippini et al. |
| 7,307,639 B1 | 12/2007 | Dumitras et al. |
| 7,356,085 B2 | 4/2008 | Gavrilescu et al. |
| 7,463,780 B2 | 12/2008 | Fukuhara et al. |
| 7,471,830 B2 | 12/2008 | Lim et al. |
| 7,580,584 B2 | 8/2009 | Holcomb et al. |
| 7,738,554 B2 | 6/2010 | Lin et al. |
| 7,778,476 B2 | 8/2010 | Alvarez et al. |
| 7,801,383 B2 | 9/2010 | Sullivan |
| 7,869,517 B2 | 1/2011 | Ghanbari |
| 7,889,790 B2 | 2/2011 | Sun |
| 7,995,649 B2 | 8/2011 | Zuo et al. |
| 2001/0048718 A1 | 12/2001 | Bruls et al. |
| 2002/0021756 A1* | 2/2002 | Jayant et al. ............ 375/240.16 |
| 2002/0024999 A1 | 2/2002 | Yamaguchi et al. |
| 2002/0044602 A1 | 4/2002 | Ohki |
| 2002/0118748 A1 | 8/2002 | Inomata et al. |
| 2002/0118884 A1 | 8/2002 | Cho et al. |
| 2002/0136297 A1 | 9/2002 | Shimada et al. |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0053702 A1 | 3/2003 | Hu |
| 2003/0095599 A1 | 5/2003 | Lee et al. |
| 2003/0103677 A1 | 6/2003 | Tastl et al. |
| 2003/0108100 A1 | 6/2003 | Sekiguchi et al. |
| 2003/0113026 A1 | 6/2003 | Srinivasan et al. |
| 2003/0128754 A1 | 7/2003 | Akimoto et al. |
| 2003/0128756 A1 | 7/2003 | Oktem |
| 2003/0138150 A1* | 7/2003 | Srinivasan .................... 382/238 |
| 2003/0185420 A1 | 10/2003 | Sefcik et al. |
| 2003/0194010 A1 | 10/2003 | Srinivasan et al. |
| 2003/0206582 A1 | 11/2003 | Srinivasan et al. |
| 2003/0215011 A1 | 11/2003 | Wang et al. |
| 2003/0219073 A1 | 11/2003 | Lee et al. |
| 2003/0223493 A1 | 12/2003 | Ye et al. |
| 2003/0235247 A1 | 12/2003 | Wu et al. |
| 2004/0008901 A1 | 1/2004 | Avinash |
| 2004/0022316 A1 | 2/2004 | Ueda et al. |
| 2004/0036692 A1 | 2/2004 | Alcorn et al. |
| 2004/0090397 A1 | 5/2004 | Doyen et al. |
| 2004/0091168 A1 | 5/2004 | Jones et al. |
| 2004/0151243 A1 | 8/2004 | Bhaskaran et al. |
| 2004/0158719 A1 | 8/2004 | Lee et al. |
| 2004/0190610 A1 | 9/2004 | Song et al. |
| 2004/0202376 A1 | 10/2004 | Schwartz et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0002575 A1 | 1/2005 | Joshi et al. |
| 2005/0008075 A1 | 1/2005 | Chang et al. |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0024487 A1 | 2/2005 | Chen |
| 2005/0031034 A1 | 2/2005 | Kamaci et al. |
| 2005/0036698 A1 | 2/2005 | Beom |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0053151 A1 | 3/2005 | Lin et al. |
| 2005/0053158 A1 | 3/2005 | Regunathan et al. |
| 2005/0084009 A1 | 4/2005 | Furukawa et al. |
| 2005/0084013 A1 | 4/2005 | Wang et al. |
| 2005/0094731 A1 | 5/2005 | Xu et al. |
| 2005/0105612 A1 | 5/2005 | Sung et al. |
| 2005/0105622 A1 | 5/2005 | Gokhale |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180500 A1 | 8/2005 | Chiang et al. |
| 2005/0180502 A1 | 8/2005 | Puri |
| 2005/0190836 A1 | 9/2005 | Lu et al. |
| 2005/0207492 A1 | 9/2005 | Pao |
| 2005/0232501 A1 | 10/2005 | Mukerjee |
| 2005/0238096 A1 | 10/2005 | Holcomb et al. |
| 2005/0254719 A1 | 11/2005 | Sullivan |
| 2005/0259729 A1 | 11/2005 | Sun |
| 2005/0276493 A1 | 12/2005 | Xin et al. |
| 2006/0013307 A1 | 1/2006 | Olivier et al. |
| 2006/0013309 A1 | 1/2006 | Ha et al. |
| 2006/0018552 A1 | 1/2006 | Malayath et al. |
| 2006/0034368 A1 | 2/2006 | Klivington |
| 2006/0038826 A1 | 2/2006 | Daly |
| 2006/0056508 A1 | 3/2006 | Lafon et al. |
| 2006/0071825 A1 | 4/2006 | Demos |
| 2006/0083308 A1 | 4/2006 | Schwarz et al. |
| 2006/0088098 A1 | 4/2006 | Vehvilainen |
| 2006/0098733 A1 | 5/2006 | Matsumura et al. |
| 2006/0104350 A1 | 5/2006 | Liu |
| 2006/0104527 A1 | 5/2006 | Koto et al. |
| 2006/0126724 A1 | 6/2006 | Cote |
| 2006/0126728 A1 | 6/2006 | Yu et al. |
| 2006/0133478 A1 | 6/2006 | Wen |
| 2006/0133479 A1 | 6/2006 | Chen et al. |
| 2006/0140267 A1 | 6/2006 | He et al. |
| 2006/0165176 A1 | 7/2006 | Raveendran et al. |
| 2006/0188014 A1 | 8/2006 | Civanlar et al. |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0239576 A1 | 10/2006 | Mukherjee |
| 2006/0245506 A1* | 11/2006 | Lin et al. .................. 375/240.29 |
| 2006/0256851 A1 | 11/2006 | Wang et al. |
| 2006/0256867 A1 | 11/2006 | Turaga et al. |
| 2006/0257037 A1 | 11/2006 | Samadani |
| 2006/0268990 A1 | 11/2006 | Lin et al. |
| 2006/0268991 A1 | 11/2006 | Segall et al. |
| 2007/0002946 A1 | 1/2007 | Bouton et al. |
| 2007/0009039 A1 | 1/2007 | Ryu |
| 2007/0009042 A1 | 1/2007 | Craig et al. |
| 2007/0053603 A1 | 3/2007 | Monro |
| 2007/0081586 A1 | 4/2007 | Raveendran et al. |
| 2007/0081588 A1 | 4/2007 | Raveendran et al. |
| 2007/0140333 A1 | 6/2007 | Chono et al. |
| 2007/0147497 A1 | 6/2007 | Bao et al. |
| 2007/0160138 A1 | 7/2007 | Wedi et al. |
| 2007/0160151 A1 | 7/2007 | Bolton et al. |
| 2007/0189626 A1 | 8/2007 | Tanizawa et al. |
| 2007/0201553 A1 | 8/2007 | Shindo |
| 2007/0230565 A1 | 10/2007 | Tourapis et al. |
| 2007/0237221 A1 | 10/2007 | Hsu et al. |
| 2007/0237222 A1 | 10/2007 | Xia et al. |
| 2007/0237236 A1 | 10/2007 | Chang et al. |
| 2007/0237237 A1 | 10/2007 | Chang et al. |
| 2007/0248163 A1 | 10/2007 | Zuo et al. |
| 2007/0248164 A1 | 10/2007 | Zuo et al. |
| 2007/0258518 A1 | 11/2007 | Tu et al. |
| 2007/0258519 A1 | 11/2007 | Srinivasan |
| 2008/0008394 A1 | 1/2008 | Segall |
| 2008/0031346 A1 | 2/2008 | Segall |
| 2008/0068446 A1 | 3/2008 | Barkley et al. |
| 2008/0080615 A1 | 4/2008 | Tourapis et al. |
| 2008/0089410 A1* | 4/2008 | Lu et al. .................. 375/240.03 |
| 2008/0101465 A1 | 5/2008 | Chono et al. |
| 2008/0144951 A1 | 6/2008 | Zhang |
| 2008/0187042 A1 | 8/2008 | Jasinschi |
| 2008/0192822 A1 | 8/2008 | Chang et al. |
| 2008/0240235 A1 | 10/2008 | Holcomb et al. |
| 2008/0240250 A1 | 10/2008 | Lin et al. |
| 2008/0240257 A1 | 10/2008 | Chang et al. |
| 2008/0304562 A1 | 12/2008 | Chang et al. |
| 2009/0207919 A1 | 8/2009 | Yin et al. |
| 2009/0213930 A1 | 8/2009 | Ye et al. |
| 2009/0245587 A1 | 10/2009 | Holcomb et al. |

| | | |
|---|---|---|
| 2009/0290635 A1 | 11/2009 | Kim et al. |
| 2009/0296808 A1 | 12/2009 | Regunathan et al. |
| 2010/0177826 A1 | 7/2010 | Bhaumik et al. |

FOREIGN PATENT DOCUMENTS

| | | |
|---|---|---|
| EP | 1465349 | 10/2004 |
| EP | 1871113 | 12/2007 |
| GB | 897363 | 5/1962 |
| JP | 05-227525 | 9/1993 |
| JP | 07-222145 | 8/1995 |
| JP | 07-250327 | 9/1995 |
| JP | 08-336139 | 12/1996 |
| JP | 10-336656 | 12/1998 |
| JP | 11-041610 | 2/1999 |
| JP | 2001-358948 | 12/2001 |
| JP | 2002-058029 | 2/2002 |
| JP | 2003061090 | 2/2003 |
| JP | 2003-230142 | 8/2003 |
| JP | 2004-023288 | 1/2004 |
| JP | 2004-247889 | 9/2004 |
| JP | 6-296275 | 10/2004 |
| JP | 2005-260467 | 9/2005 |
| JP | 2007-281949 | 10/2007 |
| KR | 132895 | 10/1998 |
| RU | 2119269 | 9/1998 |
| RU | 2119727 | 9/1998 |
| RU | 2127962 | 3/1999 |
| WO | WO 93/09636 | 5/1993 |
| WO | WO 97/21302 | 6/1997 |
| WO | WO 99/25121 | 5/1999 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 02/080575 | 10/2002 |
| WO | WO 2004/100554 | 11/2004 |
| WO | WO 2004/100556 | 11/2004 |
| WO | WO 2005/065030 | 7/2005 |
| WO | WO 2005/076614 | 8/2005 |
| WO | WO 2006/075895 | 7/2006 |
| WO | WO 2006/112620 | 10/2006 |
| WO | WO 2007/015047 | * 2/2007 |
| WO | WO 2007/130580 | 11/2007 |

OTHER PUBLICATIONS

Bist et al., "Adaptive Quantization for Low Bit Rate Video Coding," *Proc. 1998 Int'l Conf. on Image Processing (ICIP 98)*, pp. 925-928 (1998).
Farvardin et al., "Optimum quantizer performance for a class of non-Gaussian memoryless sources," *IEEE Trans. Inform. Theory*, vol. IT-30, No. 3, pp. 485-497 (May 1984).
Flierl et al., "A Video Codec Incorporating Block-Based Multi-Hypothesis Motion-Compensated Prediction," in *Proceedings of the SPIE Conference on Visual Communications and image Processing*, Perth, Australia, vol. 4067, pp. 238-249 (Jun. 2000).
Flierl et al., "Generalized B Pictures and the Draft H.264/AVC Video Compression Standard," in *IEEE Transactions on Circuits and Systems for Video Technology*, vol. 13, No. 7, pp. 587-597 (Jul. 2003).
Foos et al., "JPEG 2000 compression of medical imagery," *Proc. SPIE*, vol. 3980, pp. 85-96 (2000).
Garrigues et al., "Atom position coding in a matching pursuit based video coder," *Lecture Notes in Computer Science*, 4 pp. (2005).
Gish et al., "Asymptotically efficient quantizing," *IEEE Trans. Inform. Theory*, vol. IT-14, No. 5 (Sep. 1968).
Golston et al., "Video codecs tutorial: Trade-offs with H.264, VC-1 and other advanced codecs," *Video/Imaging Design Line*, 9 pp. (Mar. 2006).
"H.264 & IPTV Over DSL—Enabling New Telco Revenue Opportunities," *White Paper*, Intel/Envivio, May 15, 2004, available at http://www.envivio.com/images/products/H264whitepaper.pdf.
"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (1993).
"ISO/IEC 13818-2. Generic coding of moving pictures and associated audio information," MPEG (Moving Pictures Expert Group), International Organization for Standardization, MPEG2 Video (1994).
ISO/IEC, "14496-2: Information Technology—Coding of Audio-Visual Objects—Part 2: Visual," 724 pp. (2004).
ITU-T, "ITU-T Recommendation H.261: Video Codec for Audiovisual Services at $p \times 64$ kbits," 28 pp. (1993).
ITU-T, "ITU-T Recommendation H.262: Information Technology—Generic Coding of Moving Pictures and Associated Audio Information: Video," 218 pp. (1995).
ITU-T, "ITU-T Recommendation H.263: Video Coding for Low Bit Rate Communication," 167 pp. (1998).
Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).
Joshi et al., "Comparison of generalized Gaussian and Laplacian modeling in DCT image coding," *IEEE Signal Proc. Letters*, vol. SPL-2, No. 5, pp. 81-82 (May 1995).
Kim et al., "Still image coding based on vector quantization and fractal approximation," *IEEE Transactions on Image Processing*, vol. 5, No. 4, pp. 587-597 (1996).
Lam et al., "A mathematical analysis of the DCT coefficient distributions for images," *IEEE Trans. Image Proc.*, vol. IP-9, No. 10, pp. 1661-1666 (Oct. 2000).
LeGall, "MPEG: A Video Compression Standard for Multimedia Application," *Communications of the ACM*, vol. 34, No. 4, pp. 47-58 (Apr. 1991).
LeGall, "The MPEG Video Compression Algorithm," *Signal Processing: Image Communication 4*, vol. 4, No. 2, pp. 129-140 (Apr. 1992).
LeGall et al., "Transmission of HDTV signals under 140 Mbit/s using a subband decomposition and Discrete Cosine Transform coding," in *Signal Processing of HDTV*, Elsevier, Amsterdam, pp. 287-293 (1988).
Limb, "A Picture-Coding Algorithm for the Merli Scan," *IEEE Transactions on Communications*, pp. 300-305 (Apr. 1973).
Lloyd, "Least squares quantization in PCM," *IEEE Trans. Inform. Theory*, vol. IT-28, No. 2, pp. 7-12 (Mar. 1982) (reprint of work originally presented in Jul. 1957).
Loomis, "Using the Advanced Settings of the Windows Media Video 9 Advanced Profile Codec," 13 pp. (Document dated Apr. 2006) [Downloaded from the World Wide Web on May 31, 2007].
Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).
Mallat, "A theory for multiresolution signal decomposition: the wavelet representation," *IEEE Trans. Pattern Anal. And Machine Intell.*, vol. PAMI-11, No. 7, pp. 674-692 (Jul. 1989).
Max, "Quantizing for minimum distortion," *IEEE Trans. Inform. Theory*, vol. IT-6, No. 1, pp. 7-12 (Mar. 1960).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mitra et al., "Two-Stage Color Palettization for Error Diffusion," *Proceedings of SPIE*, pp. 207-217 (Jun. 2002).
Mook, "Next-Gen Windows Media Player Leaks to the Web," *BetaNews*, 17 pp. (Jul. 19, 2002) [Downloaded from the World Wide Web on Aug. 8, 2003].
Muller, "Distribution shape of two-dimensional DCT coefficients of natural images," *IEE Electronics Letters*, vol. 29, No. 22 (Oct. 1993).
Murakami et al., "Comparison between DPCM and Hadamard transform coding in the composite coding of the NTSC color TV signal," *IEEE Trans. on Commun.*, vol. COM-30, No. 3, pp. 469-479 (Mar. 1982).
Musmann et al., "Advances in Picture Coding," *Proceedings of the IEEE*, vol. 73, No. 4, pp. 523-548 (Apr. 1985).
Neff et al., "Modulus Quantization for Matching Pursuit Video Coding," *IEEE Transactions on Circuits and Systems for Video Technology*, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

Park et al., "A post processing method for reducing quantization effects in low bit-rate moving picture coding," *IEEE Trans. Circuits Syst. Video Technology*, vol. 9, pp. 161-171 (Feb. 1999).

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

Reininger et al., "Distribution of two-dimensional DCT coefficients for images," *IEEE Trans. on Commun.*, vol. COM-31, No. 6, pp. 835-839 (Jun. 1983).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Shen et al., "Rate-Distortion Optimization for Fast Hierarchical B-Picture Transcoding," *IEEE*, pp. 5279-5282 (2006).

Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).

Sony Electronics Inc., "Sony Vizaro DVD Encoder System DVA-V700," 4 pp. (2001).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Tsang et al., "Fuzzy Based Rate Control for Real-Time MPEG Video," *IEEE Transactions on Fuzzy Systems*, pp. 504-516 (1998).

Wien, "Variable Block-Size Transforms for Hybrid Video Coding," Dissertation, 182 pp. (Feb. 2004).

Wu et al., "Context-based adaptive lossless codec," *IEEE Trans. Communications*, vol. 45, pp. 437-444 (1997).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Yang et al., "Rate Control for Videophone Using Local Perceptual Cues," *IEEE Transactions on Circuits and Systems for Video Tech.*, vol. 15, No. 4, pp. 496-507 (Apr. 2005).

Yuen et al., "A survey of hybrid MC/DPCM/DCT video coding distortions," *Signal Processing*, vol. 70, pp. 247-278 (1998).

Zaid et al, "Wavelet Image Coding With adaptive Thresholding" *CSNDSP'02, 3th Conference on Communication Systems, Networks and Digital Signal Processing*, pp. 1-4 (Jul. 2002).

Zhang et al., "Adaptive Field/Frame Selection for High Compression Coding," *SPIE Conf. on Image and Video Communications and Processing*, 13 pp. (Jan. 2003).

Masala et al., "Perceptually Optimized MPEG Compression of Synthetic Video Sequences," Proc. ICIP, pp. I-601-I-604, *IEEE* (2005).

Nougaret et al., "Quick Tuning of a Reference Locomotion Gait," IEEE Proc. Computer Animation '95, *IEEE*, 8 pp. (1995).

Augustine et al., "Region of Interest Editing of MPEG-2 Video Streams in the Compressed Domain," *2004 IEEE Int'l Conf. on Multimedia and Expo: ICME'04*, vol. 1, Issue 27-30, pp. 559-562 (Jun. 2004).

Chang et al., "Adaptive Wavelet Thresholding for Image Denoising and Compression," IEEE Trans on Image Processing, vol. 9, No. 9, pp. 1532-1546 (Sep. 2000).

Chrysafis et al., "Context-based Adaptive Image Coding," Proc. of the 30th Asilomar Conf. on Signals, Systems, and Computers, 5 pp. (Nov. 1996).

De Simone, et al., "A comparative study of JPEG 2000, AVC/H.264, and HD Photo," *SPIE Optics and Photonics, Applications of Digital Image Processing XXX*, 12 pp. (Aug. 2007).

Gavrilescu et al., "Embedded Multiple Description Scalar Quantizers," IEE Electronics Letters, vol. 39, No. 13, 12 pp. (Jun. 2003).

Golner et al., "Region Based Variable Quantization for JPEG Image Compression," *IEEE Symp. on Circuits and Systems*, pp. 604-607 (Aug. 2000).

Hannuksela et al., "Sub-picture: ROI coding and unequal error protection," Proc. 2002 Int'l Conf. on Image Processing, vol. 3, Issue 24-28, pp. 537-540 (Jun. 2002).

Kopp, "Lossless Wavelet Based Image Compression with Adaptive 2D Decomposition," *Proc. 4th Int'l Conf. in Central Europe on Computer Graphics and Visualization 96*, pp. 141-149 (Feb. 12-16, 1996).

Lei et al., "Rate Adaptation Transcoding for Precoded Video Streams," 13 pp. (2000).

Lin et al, "Low-complexity face-assisted coding scheme for low bit rate video telephony," *IEICE Trans. Inf. & Sys.*, vol. E86-D, No. 1, pp. 101-108 (Jan. 2003).

Lin et al, "Low-complexity face-assisted video coding," *Proc. 2000 Int'l Conf. on Image Processing*, vol. 2, pp. 207-210 (Sep. 2000).

Luo et al., "A Scene Adaptive and Signal Adaptive Quantization for Subband Image and Video Compression Using Wavelets," IEEE Trans. on Circuits and Systems for Video Tech., vol. 7, No. 2, pp. 343-357 (Apr. 1997).

Radha et al., "The MPEG-4 Fine-Grained Scalable Video Coding Method for Multimedia Streaming Over IP," *IEEE Trans. on Multimedia*, vol. 3, No. 1, pp. 53-68 (Mar. 2001).

Schallauer et al., "PRESTO—Preservation Technologies for European Broadcast Archives, D5.4—High Quality Compression for Film and Video," 80 pp. (Sep. 18, 2002).

Wang, et al., "A Framework for Adaptive Scalable Video Coding Using Wyner-Ziv Techniques," *EURASIP Journal on Applied Signal Processing*, pp. 1-18 (month unknown, 2006).

Watson et al., "Visibility of Wavelet Quantization Noise," IEEE Trans. on Image Processing, vol. 6, No. 8, pp. 1164-1175 (Aug. 1997).

Xiong et al., "Wavelet Packet Image Coding Using Space-Frequency Quantization," *IEEE Transactions on Image Processing*, vol. 7, No. 6, pp. 892-898 (Jun. 1998).

Calderbank et al., "Wavelet transforms that map integers to integers," Mathematics Subject Classification, Aug. 1996, 39 pages.

Donoho et al., "Data compression and Harmonic Analysis," IEEE transaction on information theory, vol. 44, No. 6, Oct. 1998, pp. 2435-2476.

ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).

ITU-T, "CCITT Recommendation T.81: Information Technology—Digital Compresion and Coding of Continuous-Tone Still Images—Requirements and Guidelines," 190 pp. (Sep. 1992).

ITU-T, "ITU-T Recommendation T.84: Terminals for Telematic Services—Information Technology—Digital Compression and Coding of Continuous-Tone Still Images: Extensions," 84 pp. (Jul. 1996).

ITU-T, "ITU-T Recommendation T.801: JPEG 2000 image coding system: Extensions," 334 pp. (Aug. 2002).

Man et al., "Three-Dimensional Subband Coding Techniques for Wireless Video Communications," IEEE Trans. on Circuits and Systems for Video Technology, vol. 12, No. 6, pp. 386-397 (Jun. 2002).

Marcellin et al., "An overview of quantization in JPEG 2000," Signal Processing: Image Communication, vol. 17, pp. 73-84 (Jan. 2002).

Srinivasan et al., "HD Photo: A new image coding technology for digital photography," Proc. of SPIE, Vo. 6696, 19 pp. (Jan. 2007).

Tong, "A perceptually adaptive JPEG coder," Thesis, University of Toronto, 124 pp. (1997).

Watson, "Perceptual Optimization of DCT Color Quantization Matrices," IEEE Conf. on Image Processing, pp. 100-104 (Nov. 1994).

Yoo et al., "Adaptive Quantization of Image Subbands with Efficient Overhead Rate Selection," IEEE Conf. on Image Processing, pp. 361-364 (Sep. 1996).

Chai et al., "Face Segmentation Using Skin-Color Map in Videophone Applications," IEEE Transaction on Circuits and Systems for Video Technology, vol. 9, No. 4, pp. 551-564, Jun. 1999.

Correia et al., "Classification of Video Segmentation Application Scenarios," IEEE Transactions on Circuits and Systems for Video Technology, vol. 14, No. 5, pp. 735-741, May 2004.

Daly et al., "Face-Based Visually-Optimized Image Sequence Coding," 1998 International Conference on Image Processing, vol. 3, pp. 443-447, Oct. 1998.

Lee et al., "Spatio-Temporal Model-Assisted Compatible Coding for Law and Very Low Bitrate Videotelephony," 3rd IEEE International Conference on Image Processing, 4 pages, Sep. 1996.

Malah, "Time-Domain Algorithms for Harmonic Reduction and Time Scaling of Speech Signals," IEEE Transactions on Acoustics, Speech, and Signal Processing, vol. ASSP-27, No. 2, Apr. 1979, 13 pages.

Richardson, H.264 and MPEG-4 Video Compression, pp. 50-56 and 187-196 (2003).

Eleftheriadis et al., "Dynamic Rate Shaping of Compressed Digital Video," IEEE Transactions on Multimedia, vol. 8, No. 2, Apr. 2006, pp. 297-314.

* cited by examiner

Figure 1, prior art

Software 280 implementing encoder or
other tool that adjusts encoder settings
for animation content

Figure 6A
602

```
#define EDGEMB_VALUE        2
#define TEXTUREMB_VALUE     1
#define TEXTURE_EDGEMB-THRESHOLD      40
#define TEXTURE_TEXTUREMB_THRESHOLD   16

For (blocks=0; blocks < total number of blocks; blocks++)
    If (pTextureMap[blocks] >= TEXTURE_EDGEMB_THRESHOLD)
        pEdgeMap[blocks] = EDGEMB_VALUE;
    else
    If (pTextureMap[blocks] >= TEXTURE_TEXTUREMB_THRESHOLD)
        pEdgeMap[blocks] = TEXTUREMB_VALUE;
    else
        pEdgeMap[blocks] = 0;
```

Figure 6B
604

```
For (blocks=0; blocks < total number of blocks; blocks++)
    If (pEdgeMap[blocks] & EDGEMB_VALUE)
    {
        pDilatedEdgeMap[blocks]         |= EDGEMB_VALUE;
        pDilatedEdgeMap[Top_Block]      |= EDGEMB_VALUE;
        pDilatedEdgeMap[Left_Block]     |= EDGEMB_VALUE;
        pDilatedEdgeMap[Right_Block]    |= EDGEMB_VALUE;
        pDilatedEdgeMap[Bottom_Block]   |= EDGEMB_VALUE;
    }
```

Figure 6C
606

```
For (blocks=0; blocks < total number of blocks; blocks++)
    pNewEdgeMap[blocks] = pDilatedEdgeMap[blocks];
    If (pDilatedEdgeMap[blocks] & EDGEMB_VALUE)
    {
        If ( !( (pDilatedEdgeMap[blocks-1] & EDGEMB_VALUE) && (pDilatedEdgeMap[blocks-1-
blockStride] & EDGEMB_VALUE) && (pDilatedEdgeMap[blocks-blockStride] & EDGEMB_VALUE) ) &&
            !( (pDilatedEdgeMap[blocks+1] & EDGEMB_VALUE) && (pDilatedEdgeMap[blocks+1-
blockStride] & EDGEMB_VALUE) && (pDilatedEdgeMap[blocks-blockStride] & EDGEMB_VALUE) ) &&
            !( (pDilatedEdgeMap[blocks-1] & EDGEMB_VALUE) && (pDilatedEdgeMap[blocks-1+
blockStride] & EDGEMB_VALUE) && (pDilatedEdgeMap[blocks+blockStride] & EDGEMB_VALUE) ) &&
            !( (pDilatedEdgeMap[blocks+1] & EDGEMB_VALUE) && (pDilatedEdgeMap[blocks+1+
blockStride] & EDGEMB_VALUE) && (pEdgeDilatedMap[blocks+blockStride] & EDGEMB_VALUE) ) )
        { pNewEdgeMap[blocks] &= ~EDGEMB_VALUE; }
```

ENCODING ADJUSTMENTS FOR ANIMATION CONTENT

BACKGROUND

Digital video consumes large amounts of storage and transmission capacity. Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

In general, video compression techniques include "intra-picture" compression and "inter-picture" compression. Intra-picture compression techniques compress an individual picture, and inter-picture compression techniques compress a picture with reference to a preceding and/or following picture (often called a reference or anchor picture) or pictures.

I. Intra and Inter Compression.

FIG. 1 illustrates block-based intra compression in an example encoder. In particular, FIG. 1 illustrates intra compression of an 8×8 block (105) of samples by the encoder. The encoder splits a picture into non-overlapping 8×8 blocks of samples and applies a forward 8×8 frequency transform (110) (such as a discrete cosine transform ("DCT")) to individual blocks such as the block (105). The frequency transform (110) maps the sample values to transform coefficients. In typical encoding scenarios, a relatively small number of frequency coefficients capture much of the energy or signal content in video.

The encoder quantizes (120) the transform coefficients (115), resulting in an 8×8 block of quantized transform coefficients (125). Quantization can affect the fidelity with which the transform coefficients are encoded, which in turn can affect bit rate. Coarser quantization tends to decrease fidelity to the original transform coefficients as the coefficients are more coarsely approximated. Bit rate also decreases, however, when decreased complexity can be exploited with lossless compression. Conversely, finer quantization tends to preserve fidelity and quality but result in higher bit rates.

Returning to FIG. 1, further encoding varies depending on whether a coefficient is a DC coefficient (the lowest frequency coefficient shown as the top left coefficient in the block (125)), an AC coefficient in the top row or left column in the block (125), or another AC coefficient. The encoder typically encodes the DC coefficient (126) as a differential from the reconstructed DC coefficient (136) of a neighboring 8×8 block. The encoder entropy encodes (140) the differential. The entropy encoder can encode the left column or top row of AC coefficients as differentials from AC coefficients of a corresponding left column or top row of a neighboring 8×8 block. The encoder scans (150) the 8×8 block (145) of predicted, quantized AC coefficients into a one-dimensional array (155). The encoder then entropy encodes the scanned coefficients using a variation of run/level coding (160).

In corresponding decoding, a decoder produces a reconstructed version of the original 8×8 block. The decoder entropy decodes the quantized transform coefficients, scanning the quantized coefficients into a two-dimensional block, and performing AC prediction and/or DC prediction as needed. The decoder inverse quantizes the quantized transform coefficients of the block and applies an inverse frequency transform (such as an inverse DCT ("IDCT")) to the de-quantized transform coefficients, producing the reconstructed version of the original 8×8 block. When a picture is used as a reference picture in subsequent motion compensation (see below), an encoder also reconstructs the picture.

Inter-picture compression techniques often use motion estimation and motion compensation to reduce bit rate by exploiting temporal redundancy in a video sequence. Motion estimation is a process for estimating motion between pictures. In general, motion compensation is a process of reconstructing pictures from reference picture(s) using motion data, producing motion-compensated predictions.

Whereas the example encoder divides an intra-coded picture into non-overlapping 8×8 blocks, the encoder more generally divides an inter-coded picture into rectangular, non-overlapping blocks of N×M samples, where N and M can be 4 or 8, so block size is 4×4, 4×8, 8×4 or 8×8. For a current unit (e.g., 8×8 block) being encoded, the encoder computes the sample-by-sample difference between the current unit and its motion-compensated prediction to determine a residual (also called error signal). The residual is frequency transformed, quantized, and entropy encoded.

If a predicted picture is used as a reference picture for subsequent motion compensation, the encoder reconstructs the predicted picture. When reconstructing residuals, the encoder reconstructs transform coefficients that were quantized and performs an inverse frequency transform. The encoder performs motion compensation to compute the motion-compensated predictors, and combines the predictors with the residuals. During decoding, a decoder typically entropy decodes information and performs analogous operations to reconstruct residuals, perform motion compensation, and combine the predictors with the reconstructed residuals.

II. Lossy Compression and Quantization.

Lossless compression reduces the bit rate of information by removing redundancy from the information without any reduction in fidelity. Lossless compression techniques reduce bit rate at no cost to quality, but can only reduce bit rate up to a certain point. Decreases in bit rate are limited by the inherent amount of variability in the statistical characterization of the input data, which is referred to as the source entropy.

In contrast, with lossy compression, quality suffers somewhat but the achievable decrease in bit rate is more dramatic. Lossy compression techniques can be used to reduce bit rate more than lossless compression techniques, but some of the reduction in bit rate is achieved by reducing quality, and the lost quality cannot be completely recovered. Lossy compression is often used in conjunction with lossless compression, in a system design in which the lossy compression establishes an approximation of the information and lossless compression techniques are applied to represent the approximation.

In general, an encoder varies quantization to trade off quality and bit rate. A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes also affect decisions made in codec design as well as decisions made during actual encoding.

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, and adaptive or non-adaptive quantization.

According to one possible definition, a scalar quantizer is an approximating functional mapping of an input value x to a quantized value Q[x], sometimes called a reconstructed value. Each value of x within a given range between a pair of adjacent thresholds is assigned the same quantized value Q[x]. (At a threshold, one of the two possible quantized values is assigned to an input x, depending on the system.) The placement of the thresholds on the number line may be uniformly spaced or non-uniformly spaced.

A scalar quantizer can be decomposed into two distinct stages. The first stage is the classifier stage, in which a classifier functional mapping maps an input x to a quantization index A[x], which is often integer-valued. In essence, the classifier segments an input number line or data set. Each value of x within a given range is assigned the same quantization index. In the second stage, a reconstructor functional mapping maps each quantization index k to a reconstruction value $\beta[k]$. In essence, the reconstructor selects a value for reconstruction of each region determined by the classifier. Overall, the classifier relates to the reconstructor as follows: $Q[x]=\beta[A[x]]$.

In common usage, the term "quantization" is often used to describe the classifier stage, which is performed during encoding. The term "inverse quantization" is similarly used to describe the reconstructor stage, whether performed during encoding or decoding.

A non-uniform quantizer has threshold values that are not uniformly spaced for all classifier regions. According to one possible definition, a dead zone plus uniform threshold quantizer is a quantizer with uniformly spaced threshold values for all classifier regions except the one containing the zero input value (which is called the dead zone ("DZ")). In a general sense, a dead zone plus uniform threshold quantizer is a non-uniform quantizer, since the DZ size is different than the size for other classifier regions.

In many systems, the extent of quantization is parameterized in terms of quantization step size, which is adapted to regulate quality and/or bit rate. Coarser quantization uses larger quantization step sizes. Finer quantization uses smaller quantization step sizes. Often, for purposes of signaling and reconstruction, quantization step sizes are parameterized as multiples of a smallest quantization step size for a picture, macroblock or other unit of video.

Some standards and products also allow specification of a quantization matrix, or scaling matrix, that indicates different weights for different frequency coefficients of a block, so as to apply relatively coarser quantization to perceptually less important coefficients. Frequency coefficients are then quantized and inverse quantized using weighted quantization step sizes. For example, a scaling matrix for an intra-coded block uses higher weights for high frequency coefficients and lower weights for low frequency coefficients, which tends to shift distortion that is introduced to high frequency coefficients where it is less apt to cause perceptible quantization artifacts.

Some standards and products support selection between different reconstruction rules. For example, in some systems, a decoder can switch between a "uniform" quantizer reconstruction rule and a "non-uniform" quantizer reconstruction rule. Typically, for a given reconstruction rule, standards and products specify reconstruction values that correspond to midpoint reconstruction for the sake of simplicity. (Such reconstruction points are halfway between notional thresholds for quantization bins.)

Standards and product specifications that focus only on achieving interoperability will often specify reconstruction values without specifying a classification rule. In other words, some specifications may define the reconstructor functional mapping without defining the classifier functional mapping. This allows a decoder built to comply with the standard/ product to reconstruct information correctly. In contrast, encoders are often given the freedom to change the classifier. For classification, the thresholds can be defined so that certain input values will be mapped to more common (and hence, lower bit rate) indices, which makes the reconstruction values closer to optimal for some content. When an encoder defines quantization bin boundaries, this allows the encoder to adjust to distributions in values. For example, for a given quantization parameter ("QP"), an encoder may define the DZ threshold to be 1.2*QP for a quantizer (rather than 1*QP as might be expected given midpoint reconstruction).

III. Animation Content.

Animation content appears as TV shows and short cartoons, commercials, and full-length feature movies. In many respects, typical animation content differs from typical natural video content. Backgrounds are usually simpler and more static for animation content, and motion is usually less complex. In addition, lines between objects are typically sharp in animation content.

As a result of these and other differences, encoding animation content with a general-purpose video encoder can provide unsatisfactory rate-distortion performance. For a given bit rate, perceptual quality can be relatively poor when distortion that would be imperceptible in natural video is visible in the animation video.

One approach to ensuring quality for animation content is to losslessly encode the content. While this improves quality, of course, the bit rate for the encoded content may be prohibitively high.

Another approach to improving encoding performance for animation content is to develop and use an animation-only encoder. Such an encoder might, for example, consider information about the animation models used to create the animation content to effectively encode the content. While this improves performance, it requires access to the animation models and can require an equally specialized decoder for decoding. Many decoding devices, however, lack the resources to support an extra animation-only decoder or different decoders for different types of animation content. Moreover, in some cases, the animation models used to create the animation content are not available at the time of encoding.

While previous approaches to encoding animation content provide acceptable performance in some scenarios, they do not have the advantages of the techniques and tools described below for encoding animation content.

SUMMARY

In summary, the detailed description presents techniques and tools for encoding animation video. For example, the techniques and tools improve the performance of a general-purpose video encoder when it encodes animation content, improving quality and/or reducing bit rate for the encoded animation video.

In some embodiments, a tool such as a video encoder designates animation video for encoding as animation content, which typically involves changing one or more encoder settings or rules to improve encoding performance for the animation content. When the encoder encodes the animation video, the encoder detects edges in the animation video using texture. For example, the encoder creates a map of edges in a picture, dilates the edges to close possible gaps, erodes the dilated edges, and identifies macroblocks in the picture that have sharp edges. When the encoder quantizes the animation video, the encoder changes settings (such as quantization step size, DZ size or median filtering) for areas (e.g., macroblocks) that include detected edges so as to improve encoding quality for the areas with the detected edges.

In other embodiments, a tool such as a video encoder designates animation video for encoding as animation content, adjusting differential quantization rules to use. When encoding the animation video, the encoder quantizes the animation video according to the adjusted differential quantization rules. For example, the encoder identifies blocks of gradient areas in intra-coded content and adjusts quantization to preserve non-zero AC coefficients for those blocks. Or, the encoder identifies blocks of smooth areas and other (e.g., textured) areas of inter-coded content and performs aggressive differential quantization for the identified blocks of smooth areas, relative to the other areas.

In still other embodiments, a system includes a general-purpose video encoder and an interface for exposing encoder settings for selection. The encoder settings include an animation mode setting. The encoder includes a quantization module that incorporates rules adapted for animation content for use when the animation mode is selected.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIGS. 6A, 6B and 6C are pseudocode listings for an example implementation of edge detection in animation content.

DETAILED DESCRIPTION

The present application relates to techniques and tools for improving performance when encoding animation content. For example, settings of a general-purpose video encoder are adjusted to improve performance for encoding animation content, with encoding parameters such as quantization step size, DZ size for quantization and/or median filtering being tuned for encoding animation content.

One way to improve encoding performance for animation content is to improve the quality at which animation edges are encoded, relative to other content. Animation content often includes sharp edges separating smooth areas, and distortion introduced along edges can be especially noticeable. So, the general-purpose encoder detects edges in the animation content using texture in sample values and adjusts quantization step size and/or DZ size for macroblocks that include the detected edges.

Another way to improve encoding performance for animation content is to change the quantization rules for intra-coded animation content. Encoding intra-coded content with extra fidelity improves quality for the intra-coded pictures but also improves the accuracy of motion-compensated predictions for inter-coded pictures that use the intra-coded pictures as reference pictures. For example, the encoder preserves significant non-zero AC coefficients in areas (e.g., gradient areas) of intra-coded content to improve quality.

Still another way to improve encoding performance for animation content is to make differential quantization more aggressive. Whereas smooth areas are often quantized with greater fidelity than textured areas in natural video sequences (recognizing the effect that texture has in masking distortion), in animation content smooth areas are even more important to perceptual quality, since artifacts such as blocking artifacts are especially noticeable. As such, the encoder uses differential quantization that places relatively greater emphasis on quality for smooth areas.

Various alternatives to the implementations described herein are possible. Certain techniques described with reference to flowchart diagrams can be altered by changing the ordering of stages shown in the flowcharts, by splitting, repeating or omitting certain stages, etc. The various techniques and tools described herein can be used in combination or independently. Different embodiments implement one or more of the described techniques and tools.

Some of the techniques and tools described herein address one or more of the problems noted in the background. Typically, a given technique/tool does not solve all such problems. Rather, in view of constraints and tradeoffs in encoding time, resources, and/or quality, the given technique/tool improves encoding performance for a particular implementation or scenario.

I. Computing Environment.

Figure 1:
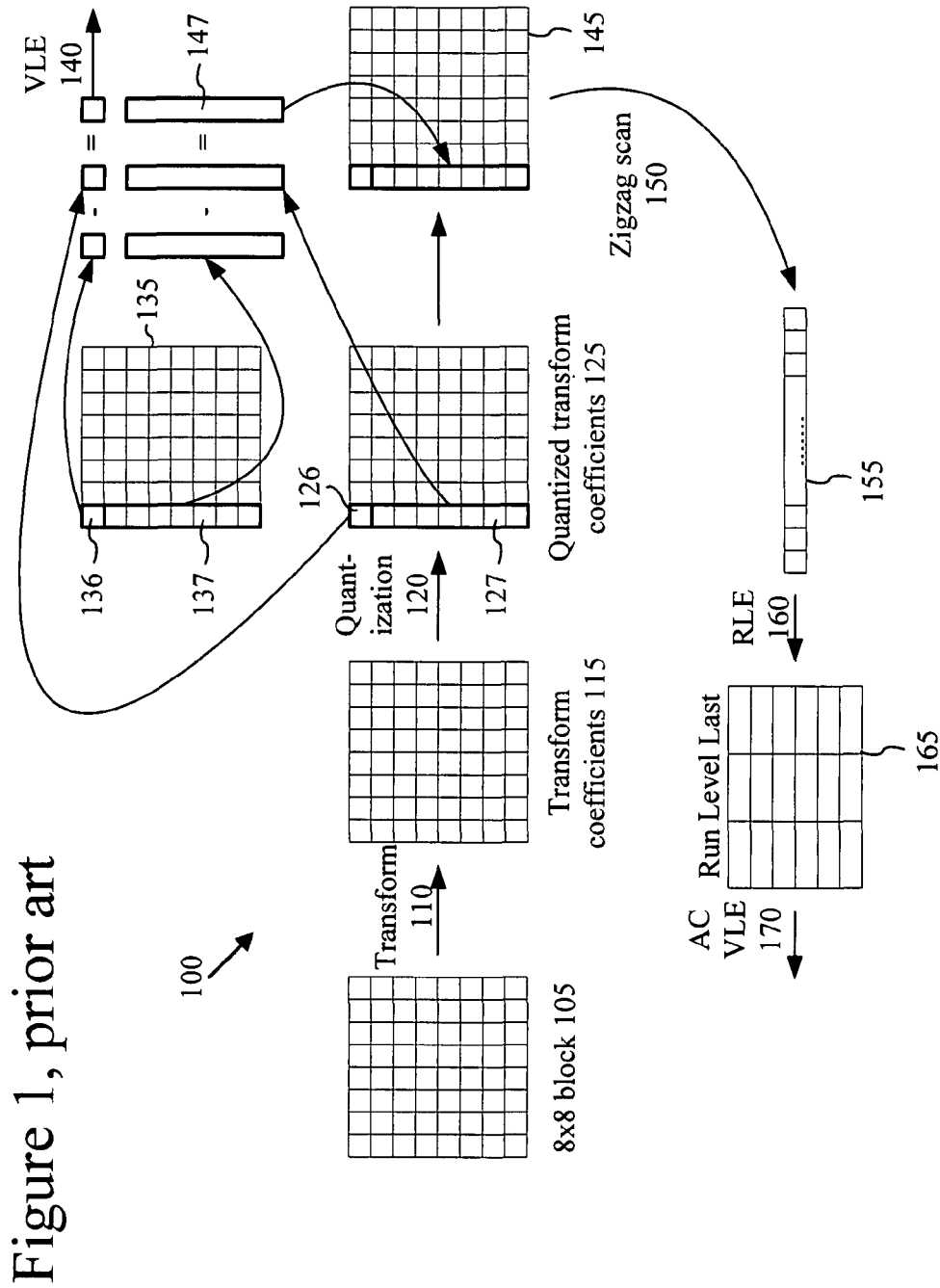
FIG. 1 is a diagram illustrating encoding of a block with intra-picture compression according to the prior art.
Figure 2:
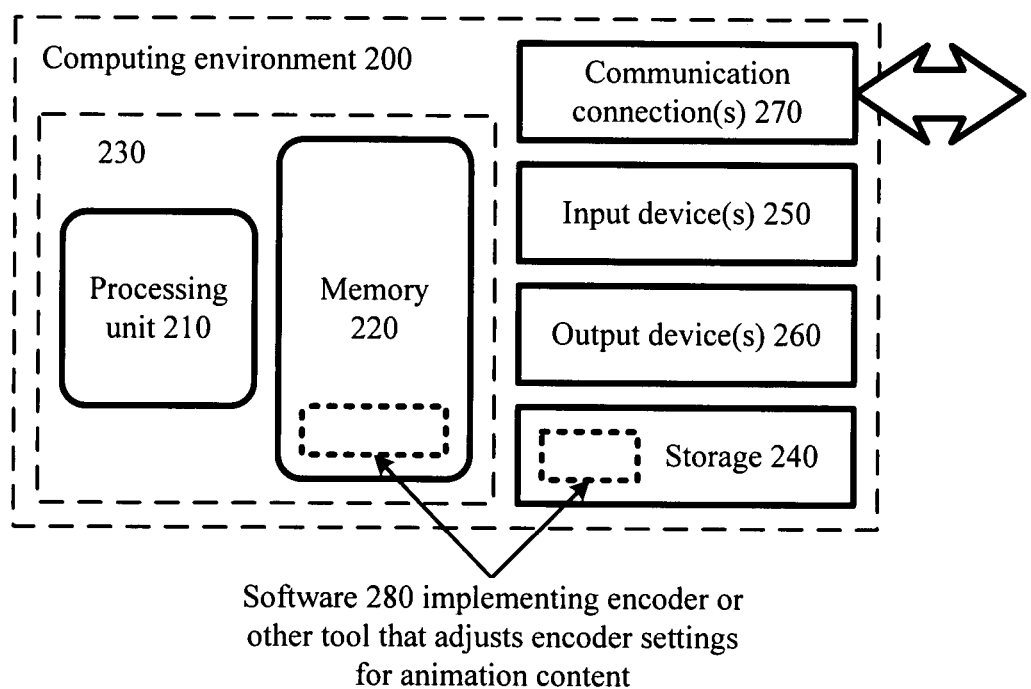
FIG. 2 is a block diagram of a suitable computing environment in which several described embodiments may be implemented.

FIG. 2 illustrates a generalized example of a suitable computing environment (200) in which several of the described embodiments may be implemented. The computing environment (200) is not intended to suggest any limitation as to scope of use or functionality, as the techniques and tools may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing an encoder with one or more of the described techniques and tools for encoding animation content.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, DVDs, or any other medium which can be used to store information and which can be accessed within the computing environment (200). The storage (240) stores instructions for the software (280) implementing the video encoder.

The input device(s) (250) may be a touch input device such as a keyboard, mouse, pen, or trackball, a voice input device, a scanning device, or another device that provides input to the computing environment (200). For audio or video encoding, the input device(s) (250) may be a sound card, video card, TV tuner card, or similar device that accepts audio or video input in analog or digital form, or a CD-ROM or CD-RW that reads audio or video samples into the computing environment (200). The output device(s) (260) may be a display, printer, speaker, CD-writer, or another device that provides output from the computing environment (200).

The communication connection(s) (270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "identify" and "adjust" to describe computer operations in a computing environment. These terms are high-level abstractions for operations performed by a computer, and should not be confused with acts performed by a human being. The actual computer operations corresponding to these terms vary depending on implementation.

II. Generalized Video Encoder.

Figure 3:
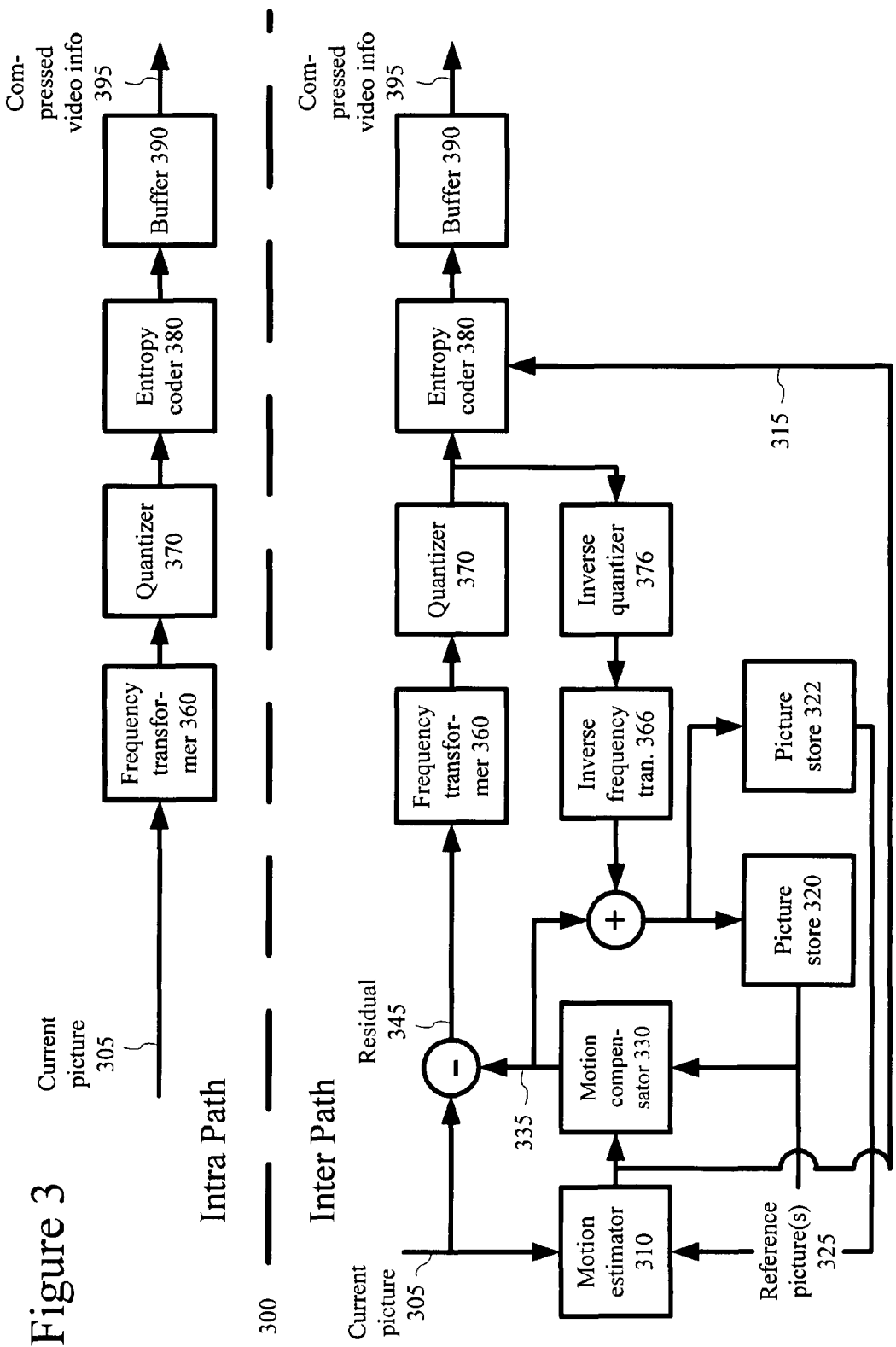
FIG. 3 is a block diagram of a video encoder system in conjunction with which several described embodiments may be implemented.

FIG. 3 is a block diagram of a generalized video encoder (300) in conjunction with which some described embodiments may be implemented. The encoder (300) receives a sequence of video pictures including a current picture (305) and produces compressed video information (395) as output to storage, a buffer, or a communications connection. The format of the output bitstream can be a Windows Media Video or VC-1 format, MPEG-x format (e.g., MPEG-1, MPEG-2, or MPEG-4), H.26x format (e.g., H.261, H.262, H.263, or H.264), or other format.

The encoder (300) processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder (300) is block-based and uses a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. The encoder (300) can perform operations on sets of samples of different size or configuration than 8×8 blocks and 16×16 macroblocks. Alternatively, the encoder (300) is object-based or uses a different macroblock or block format.

Returning to FIG. 3, the encoder system (300) compresses predicted pictures and intra-coded, key pictures. For the sake of presentation, FIG. 3 shows a path for key pictures through the encoder system (300) and a path for predicted pictures. Many of the components of the encoder system (300) are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction from one or more other pictures (which are typically referred to as reference pictures or anchors). A prediction residual is the difference between predicted information and corresponding original information. In contrast, a key picture (e.g., progressive I-frame, interlaced I-field, or interlaced I-frame) is compressed without reference to other pictures.

If the current picture (305) is a predicted picture, a motion estimator (310) estimates motion of macroblocks or other sets of samples of the current picture (305) with respect to one or more reference pictures. The picture store (320) buffers a reconstructed previous picture (325) for use as a reference picture. When multiple reference pictures are used, the multiple reference pictures can be from different temporal directions or the same temporal direction. The motion estimator (310) outputs as side information motion information (315) such as differential motion vector information.

The motion compensator (330) applies reconstructed motion vectors to the reconstructed (reference) picture(s) (325) when forming a motion-compensated current picture (335). The difference (if any) between a block of the motion-compensated current picture (335) and corresponding block of the original current picture (305) is the prediction residual (345) for the block. During later reconstruction of the current picture, reconstructed prediction residuals are added to the motion compensated current picture (335) to obtain a reconstructed picture that is closer to the original current picture (305). In lossy compression, however, some information is still lost from the original current picture (305). Alternatively, a motion estimator and motion compensator apply another type of motion estimation/compensation.

A frequency transformer (360) converts spatial domain video information into frequency domain (i.e., spectral, transform) data. For block-based video pictures, the frequency transformer (360) applies a DCT, variant of DCT, or other forward block transform to blocks of the samples or prediction residual data, producing blocks of frequency transform coefficients. Alternatively, the frequency transformer (360) applies another conventional frequency transform such as a Fourier transform or uses wavelet or sub-band analysis. The frequency transformer (360) may apply an 8×8, 8×4, 4×8, 4×4 or other size frequency transform.

A quantizer (370) then quantizes the blocks of transform coefficients. The quantizer (370) applies non-uniform, scalar quantization to the spectral data with a step size that varies on a picture-by-picture basis, macroblock-by-macroblock basis or other basis. The quantizer (370) can also apply another type of quantization, for example, a uniform or adaptive quantization for at least some spectral data coefficients, or directly quantizes spatial domain data in an encoder system that does not use frequency transformations. In described embodiments, the quantizer (370) adapts quantization for blocks of animation content by changing rules for setting DZ size and/or quantization step size.

When a reconstructed current picture is needed for subsequent motion estimation/compensation, an inverse quantizer (376) performs inverse quantization on the quantized spectral data coefficients. An inverse frequency transformer (366) performs an inverse frequency transform, producing blocks of reconstructed prediction residuals (for a predicted picture) or samples (for a key picture). If the current picture (305) was a key picture, the reconstructed key picture is taken as the reconstructed current picture (not shown). If the current picture (305) was a predicted picture, the reconstructed prediction residuals are added to the motion-compensated predictors (335) to form the reconstructed current picture. One or both of the picture stores (320, 322) buffers the reconstructed current picture for use in subsequent motion-compensated prediction.

The entropy coder (380) compresses the output of the quantizer (370) as well as certain side information (e.g., quantization step size). Typical entropy coding techniques include arithmetic coding, differential coding, Huffman coding, run length coding, LZ coding, dictionary coding, and combinations of the above. The entropy coder (380) typically uses different coding techniques for different kinds of information, and can choose from among multiple code tables within a particular coding technique.

The entropy coder (380) provides compressed video information (395) to the multiplexer ("MUX") (390). The MUX (390) may include a buffer, and a buffer level indicator may be fed back to a controller. Before or after the MUX (390), the compressed video information (395) can be channel coded for transmission over the network.

A controller (not shown) receives inputs from various modules such as the motion estimator (310), frequency transformer (360), quantizer (370), inverse quantizer (376), entropy coder (380), and buffer (390). The controller evaluates intermediate results during encoding, for example, setting quantization step sizes and performing rate-distortion analysis. The controller works with modules such as the motion estimator (310), frequency transformer (360), quantizer (370), and entropy coder (380) to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation.

In some embodiments, the controller also receives input from an encoding session wizard interface, from another encoder application interface, or from another source to designate video for encoding as animation content. For an animation mode, the encoder modifies or switches encoding rules (such as differential quantization rules) so that the rules used during encoding are adapted for animation content. For example, in some embodiments, with the animation encoding rules, the encoder (a) detects edges and adjusts quantization step size and/or DZ size to preserve detected edges, (b) uses bit allocation adapted for animation content to change how bits are allocated between different types of pictures, (c) changes quantization for I pictures to preserve gradients (e.g., by preserving non-zero AC coefficients), and/or (d) changes differential quantization behavior for P pictures and B pictures.

The relationships shown between modules within the encoder (300) indicate general flows of information in the encoder; other relationships are not shown for the sake of simplicity. In particular, FIG. 3 usually does not show side information indicating modes, tables, etc. used for a video sequence, picture, macroblock, block, etc. Such side information, once finalized, is sent in the output bitstream, typically after entropy encoding of the side information.

Particular embodiments of video encoders typically use a variation or supplemented version of the generalized encoder (300). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Encoding Adjustments for Animation Content.

This section describes techniques and tools for encoding animation content. In particular, various adjustments to a general-purpose video encoder are described that improve rate-distortion performance of the video encoder for animation content. For example, encoding settings for an implementation of an MPEG-2, VC-1, or H.264 encoder are adjusted before encoding or during encoding to more effectively encode animation content.

A. Theory and Explanation.

Animation video typically differs from natural video in several respects. First, smooth areas of animation content are typically very smooth, with little if any noise, whereas smooth areas of natural video content often have more irregularities. Second, in animation content, characters and objects are often drawn or rendered with distinctive, solid lines. When shown over a smooth background, the solid lines are even more perceptible. Third, motion (especially background motion) in animation video tends to be simpler and more predictable than motion in natural video.

In view of these and other characteristics of animation video, encoder settings of a general-purpose video encoder can be adjusted to improve performance, with encoding parameters such as quantization step size, DZ size and/or median filtering being tuned for encoding animation content. Example adjustments to encoding include:
1. detecting edges (e.g., using texture) and adjusting quantization step size and/or DZ size to preserve detected edges;
2. changing quantization for I pictures to allocate relatively more bits to them (e.g., by preserving non-zero AC coefficients), which improves the quality of the I pictures as well as the accuracy of motion-compensated predictions from the I pictures as reference pictures;
3. changing quantization for P pictures and B pictures so that texture-dependent differential quantization is more aggressive, for example, allocating relatively more bits to smooth areas and relatively fewer bits to textured areas (compared to default settings for natural video); and
4. selectively changing median filtering of residuals, for example, turning median filtering off or reducing kernel shape size for areas with edges, and using a regular median filter kernel for non-edge content.

B. Differential Quantization Rules for Animation Content.

In a typical animation sequence, background motion is relatively predictable and simple. This tends to make motion compensation more efficient, with motion-compensation residuals having no energy or low energy. Using normal bit allocation settings, an encoder may allocate more bits than are needed to encode P pictures and B pictures of animation content at a given quality level, since the residuals should use so few bits. As a result, overall quality can suffer.

In some embodiments, an encoder changes how bits are allocated between intra-coded content and inter-coded content. For example, the encoder allocates more bits to intra-coded content in I pictures and correspondingly allocates fewer bits to inter-coded content in P and B pictures. To meet the bit allocation targets, the encoder subsequently varies quantization step size, DZ size, median filtering, or another encoder setting. As the quality of anchor reference pictures improves with I picture quality, the quality of motion compensation also improves, and motion compensation residuals have less energy. In particular, this pattern holds when background motion is predictable and motion compensation accurately characterizes the motion.

Thus, the encoder can improve encoding performance for animation content by adjusting picture-by-picture bit allocations. Or, the encoder can adopt a more targeted approach to improving quality, for example, selectively increasing or decreasing quantization step size (e.g., within pictures) using differential quantization.

1. Techniques for Adjusting Differential Quantization Rules.

Figure 4B:
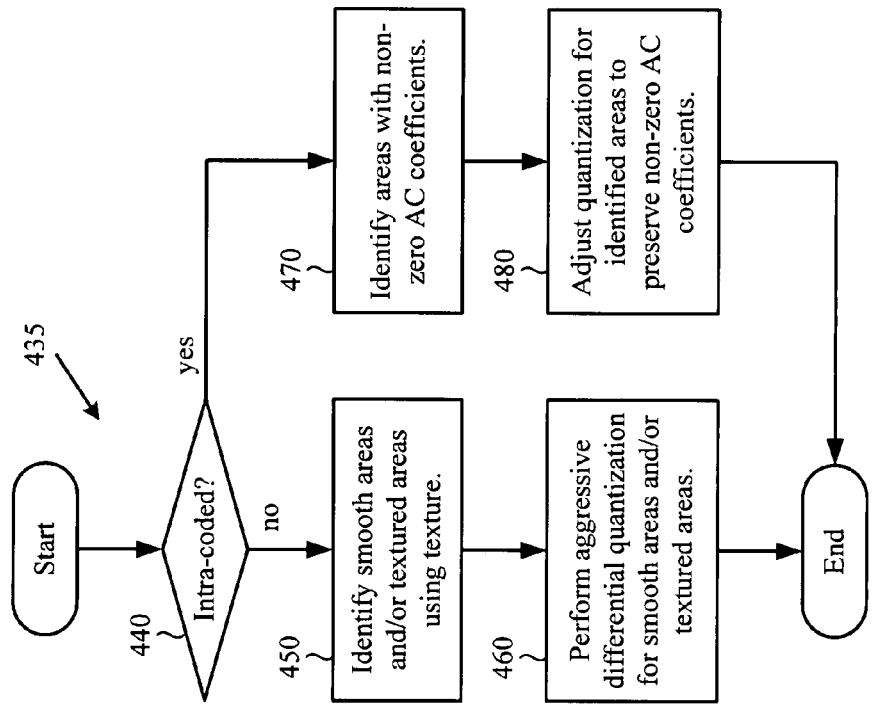
FIG. 4B is a flowchart illustrating uses of example adjusted differential quantization rules for animation content.
Figure 4A:
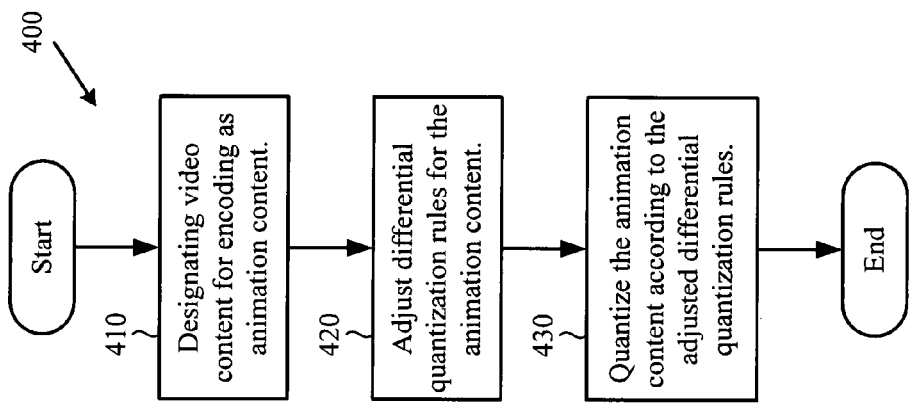
FIG. 4A is a flowchart illustrating a generalized technique for using adjusted differential quantization rules for animation content.

FIG. 4A shows a generalized technique (400) for using adjusted differential quantization rules when encoding animation content. An encoder such as the encoder (300) shown in FIG. 3 or other encoder performs the technique (400).

The encoder designates (410) video content for encoding as animation content. For example, the encoder changes one or more encoder settings in reaction to user selection of an animation encoding option that is exposed through an encoding wizard or other software interface. For example, in a media encoder tool, a user fills a checkbox indicating the video content encoded in a session is animation content. Or, the encoder changes the encoder setting(s) in reaction to instructions from software that programmatically controls the encoder. Typically, the encoder designates (410) the video content for encoding as animation content during an encoding session, and the encoder designates (410) an entire sequence or clip for encoding as animation content. Alternatively, the encoder designates (410) a different portion of video content (e.g., scene, group of pictures, picture, slice, layer) for encoding as animation content.

The encoder adjusts (420) differential quantization rules for encoding the animation content. For example, the encoder changes how intra-coded content is quantized to improve the quality of the intra-coded content. Or, the encoder changes quantization behavior for only some kinds of intra-coded content (e.g., blocks with gradients indicating edges or slopes). The encoder can also change how inter-coded content is quantized so that differential quantization is more aggressive, or so that inter-coded content is quantized with less overall fidelity. To adjust differential quantization rules, the encoder can switch between different sets of rules and/or tune default rules.

The encoder quantizes (430) the animation content according to the adjusted differential quantization rules. For example, the encoder performs scalar quantization for frequency coefficient values of blocks of a macroblock using a quantization step size set for the macroblock using the adjusted differential quantization rules. The next section describes how an encoder applies adjusted differential quantization rules in some embodiments. Alternatively, the encoder follows another approach to adjusting and applying differential quantization rules.

2. Example Adjusted Differential Quantization Rules.

In some embodiments, an encoder uses differential quantization to selectively decrease quantization step size for intra-coded content in I pictures and thereby improve quality. For P and B pictures, the encoder uses aggressive differential quantization rules that adjust quantization for inter-coded content depending on texture.

FIG. 4B shows an example technique (435) for using adjusted differential quantization rules. An encoder such as the encoder (300) shown in FIG. 3 or other encoder performs the technique (435) as part of the technique (400) shown in FIG. 4A or as part of another technique.

The encoder applies a different quantization approach depending on whether the content being encoded is inter-coded content (e.g., in a P picture or B picture) or intra-coded content (e.g., in an I picture, or as an intra-coded block in a P picture or B picture). With reference to FIG. 4B, the encoder checks (440) whether the content to be encoded is intra-coded content.

If the content is not intra-coded, the encoder identifies (450) smooth areas and/or textured areas in the content and performs (460) aggressive differential quantization. More generally, the encoder determines the level of texture in the inter-coded content and sets a quantization step size using differential quantization rules tuned for animation content. The tuned differential quantization rules employ more aggressive differential quantization between smooth content and non-smooth content. In particular, compared to texture-adaptive quantization for natural video, the threshold for what is considered smooth content is set to be relatively low, so that blocks qualify as smooth blocks less easily and are less likely to qualify for finer grained quantization. At the same time, however, non-smooth content is quantized much more aggressively relative to the smooth content.

For example, in some implementations, the encoder computes a texture level for a block as the median pixel value gradient value for the block. The encoder's range of thresholds for "smooth" is 14 to 30, and the encoder sets the threshold at 16 for inter-coded blocks of animation content (16 is a static value determined by training through encoding of animation content). In addition to this relatively low threshold setting, the encoder uses QP mapping (again determined by training through encoding of animation content) that more aggressively sets alternative QP for smooth areas, as shown in the following table.

TABLE 1

Aggressive Differential Quantization Rules for Animation Content.

```
const static U8
g_iGraphicModeDquanMapTable[MAXSTEPSIZE] =
{ 1, 1, 1, 1, 1, 2, 2, 2, 3, 3, 3, 3, 4, 4, 4, 4, 4, 4, 4, 4,
5, 5, 5, 5, 5, 5, 5, 5, 5, 5, 5, 6 };
```

Table 1 shows an array of 32 alternative QP values for smooth areas, where the array is indexed by the primary QP value (having range 0 . . . 31) for the picture. The picture-level QP is used in quantization for non-smooth areas; the alternative QP (looked up in the table) is used in quantization for smooth areas. Compared to default differential quantization, the difference between the picture-level QP and alternative QP increases more aggressively for higher values of picture-level QP. Alternatively, aggressive differential quantization for smooth areas is implemented with a different table or different quantization scheme (e.g., one that allows two or more alternative QP values in a picture or allows per macroblock specification of QP values in a picture).

For additional information about texture-adaptive differential quantization in general for these implementations, see U.S. patent application Ser. No. 11/400,788, entitled, "QUANTIZATION ADJUSTMENT BASED ON TEXTURE LEVEL," filed Apr. 7, 2006, the disclosure of which is hereby incorporated by reference.

If the content is intra-coded, the encoder identifies (470) areas with non-zero AC coefficients and adjusts (480) quantization to preserve significant non-zero AC coefficients in some or all of the identified areas. This improves overall quality for the intra-coded content. Since background motion is fairly predictable for animation content, spending more bits to encode intra-coded content (used for reference pictures) also improves the quality of motion-compensated predictions for inter-coded content. The encoder can preserve non-zero AC coefficient values for different types of intra-coded areas (e.g., smooth, texture, or edge) to improve I picture quality, or the encoder can focus on improving quality for certain types of areas.

For example, the encoder can focus on improving quality for gradient areas in intra-coded content, identifying gradient areas with non-zero, low-frequency AC coefficients and adjusting quantization to preserve significant AC coefficient values for those gradient areas. Animation content often includes flat areas, with uniform or fairly uniform sample values, and gradient areas (with edges or quick slopes) between them. The flat areas can be effectively represented at relatively high quality using DC coefficients only. If the gradient areas are encoded as DC-only blocks, however, step-wise block artifacts may appear. So, the encoder allocates more bits to intra-coded content, in particular devoting additional bits to encode gradient areas by reducing quantization step size to preserve significant non-zero AC coefficients.

For additional information about detection of preservation of non-zero AC coefficients in some implementations, see U.S. patent application Ser. No. 11/400,741, entitled, "ADJUSTING QUANTIZATION TO PRESERVE NON-ZERO AC COEFFICIENTS," filed Apr. 7, 2006, the disclosure of which is hereby incorporated by reference.

The encoder repeats the technique (435) on a block-by-block basis, macroblock-by-macroblock basis, or some other basis.

C. Differential Quantization for Edges in Animation Content.

In typical animation content, characters and objects are drawn or rendered with distinctive, solid lines. Using regular encoder settings for quantization during encoding can cause the strong lines and shapes to be distorted.

In some embodiments, to improve the quality used when encoding animation content, an encoder detects edges in the animation content and allocates more bits to the encoding of areas that include the detected edges. For example, the encoder computes texture levels for blocks, identifies macroblocks that include edges of animation content, and adjusts quantization step size and/or DZ size to preserve quality for the macroblocks that include detected edges.

Figure 5A:
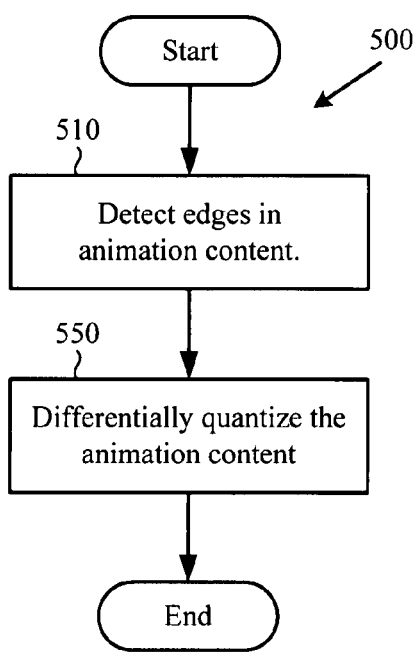
FIG. 5A is a flowchart illustrating a generalized technique for adjusting quantization settings for edges in animation content.

FIG. 5A shows a technique (500) for adjusting quantization settings for edges in animation content. An encoder such as the encoder (300) shown in FIG. 3 or other encoder performs the technique (500).

To start, the encoder detects (510) edges in the animation content. For example, the encoder uses an approach described with reference to FIG. 5B, generating a texture map of texture levels for blocks, identifying edges in the texture map, and identifying macroblocks as edge macroblocks. Alternatively, the encoder uses another approach to detecting edges in the animation content.

The encoder then differentially quantizes (550) the animation content. For example, the encoder applies differential quantization rules adapted for edges in animation content and also adjusts DZ size to relatively improve encoding quality of edge macroblocks. Alternatively, the encoder uses another approach to adjusting quantization settings and/or performing quantization using the settings.

The encoder repeats the technique (500) on a picture-by-picture basis or some other basis.

1. Detecting Edges in Animation Content.

Figure 5B:
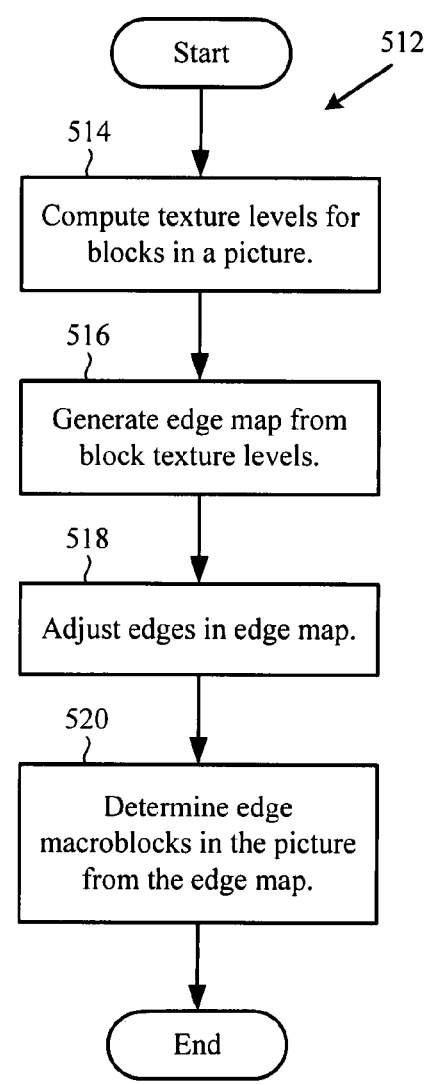
FIG. 5B is a flowchart illustrating an example technique for detecting edges in animation content.

FIG. 5B shows an example technique (512) for detecting edges in animation content. An encoder such as the encoder (300) shown in FIG. 3 or other encoder performs the technique (512) as part of the technique (500) shown in FIG. 5A or as part of another technique. In the technique (512), the encoder generates a map of edges in a picture of animation content and uses the map to determine which macroblocks of the picture include edges. The encoder performs edge detection (510) (such as technique (512)) during encoding or as part of pre-processing analysis, or the encoder performs early stages of edge detection as part of pre-processing analysis then completes later stages during encoding.

To start, the encoder computes (514) texture levels for blocks in a picture using sample values for the blocks. For example, in some implementations, the encoder computes a texture level for a block as the median pixel value gradient value for the block. For additional information about computation of texture levels in these implementations, see U.S. patent application Ser. No. 11/400,788, entitled, "QUANTIZATION ADJUSTMENT BASED ON TEXTURE LEVEL." The block texture levels provide a texture map.

Using the block texture levels, the encoder generates (516) an edge map. For example, given the range of block texture levels, the encoder uses texture level thresholds to classify each of the blocks as an edge block, texture block or smooth block. The resulting tri-value edge map includes a classification value for each of the blocks. FIG. 6A shows pseudocode (602) illustrating the generation of an edge map from block texture levels in one implementation. The block texture levels are non-negative integers, and the blocks are classified as shown in the following table.

TABLE 2

Example Texture Level to Edge Classification Mapping.

| Texture Level T | Classification | Map Value |
|---|---|---|
| T >= 40 | Edge | 2 |
| 16 >= T < 40 | Non-edge texture | 1 |
| 0 >= T < 16 | Non-edge, non-texture, smooth | 0 |

The texture threshold and edge threshold shown in FIG. 6A and Table 2 depend on implementation. In the example, the texture levels are computed for 8×8 blocks using a metric described in U.S. patent application Ser. No. 11/400,788. The static thresholds for FIG. 6A and Table 2 are set by training on typical animation content. For different sizes of blocks and/or a different metric, the thresholds can vary. In step (516) and other steps, the encoder can consider samples for co-located chroma blocks, or separately process chroma blocks, or ignore chroma blocks, depending on implementation. Alternatively, instead of using static thresholds the encoder dynamically computes thresholds to account for the relative importance of different edges at different times or in different parts of the picture.

Next, the encoder optionally adjusts (518) the edges in the edge map. In general, the encoder does this to make edges more continuous along the lines of shapes in the animation content, closing small gaps in the edges. For example, the encoder performs dilation operations to expand the edges then performs erosion operations to make the edges recede. FIGS. 6B and 6C show pseudocode (604, 606) for example dilation and erosion operations, respectively.

FIG. 6B shows a pseudocode fragment (604) implementing a 3×3 cross-shaped kernel for filtering the edge map in a dilation operation. For a current block classified as an edge block in the initial edge map, the encoder marks the block as an edge in a temporary edge map (if the current block has not already been marked as an edge in the temporary edge map from filtering for a neighbor). The encoder also marks the blocks above, to the left of, below, and to the right of the current block as being edge blocks in the temporary edge map, if those blocks are not already so marked. After filtering the blocks in the initial edge map in this way, the temporary, dilated edge map includes dilated versions of the edges in the initial edge map. Alternatively, the encoder performs the dilation operations in a different way, for example, using a kernel having a different shape or using different intermediate data structures.

FIG. 6C shows a pseudocode fragment (606) implementing a 2×2 square kernel for filtering the edge map with dilated edges for an erosion operation. The variable blockStride indicates the number of blocks in a row of the picture. For a current block classified as an edge block in the dilated edge map, the encoder checks the four 2×2 square windows in which the current block appears as a corner. If any of the four 2×2 square windows includes all edge blocks, the current block is classified as an edge block in a new edge map. Otherwise (i.e., none of the four 2×2 square windows is an all-edge window), the current block is not classified as an edge block in the new edge map. Alternatively, the encoder performs the erosion operations in a different way, for example, using a kernel having a different shape, using different intermediate data structures, or performing the operations on three rows of edge data at a time and changing the original edge map directly.

Referring again to FIG. 5B, the encoder next determines (520) edge macroblocks in the picture from the edge map. In general, the encoder uses block-level edge information to classify macroblocks. The encoder can then perform additional screening to add or remove macroblocks as edge macroblocks.

For example, the encoder flags a macroblock as an edge macroblock if two or more of its blocks are classified as edge blocks in the edge map. Alternatively, the encoder flags a macroblock as an edge macroblock only if three or more of its blocks are classified as edge blocks. In this decision, if the block edge values do not consider samples for co-located chroma blocks, the encoder can also consider edges for chroma blocks or ignore chroma blocks, depending on implementation.

Figure 7:
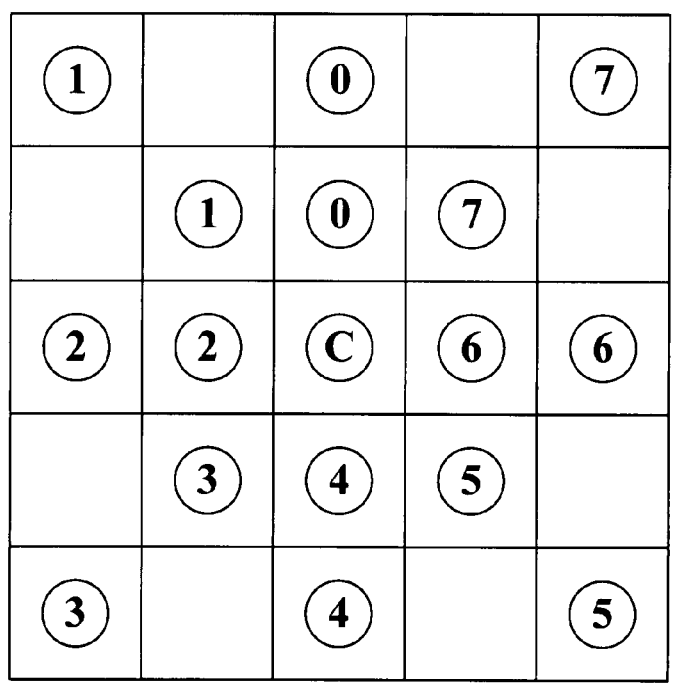
FIGS. 7 and 8 are diagrams illustrating example rules for edge detection.

To perform additional screening, for example, the encoder applies a fan filter to identify edge macroblocks. In one implementation, the fan filter has eight directions radiating at 45 degree angle increments from a current edge macroblock being analyzed. As FIG. 7 shows, two neighboring macroblocks are counted in each of the directions. For each of the directions, the encoder determines if both macroblocks in the direction have been tentatively flagged as edge macroblocks. If so, the direction has an edge angle. For the current macroblock (shown as C in FIG. 7) tentatively flagged as an edge macroblock, the encoder determines if three or fewer of the directions have edge angles. If so, the current macroblock stays an edge macroblock. Otherwise, the current macroblock is no longer flagged as an edge macroblock. Thus, if no directions have edge angles, the current macroblock includes an isolated edge but stays classified as an edge macroblock. If one, two or three directions have edge angles, the current macroblock likely includes part of a longer edge and stays classified as an edge macroblock. If four or more directions have edge angles, however, the current macroblock is considered to be part of a larger texture pattern for which quality improvement is relatively less important.

Figure 8:
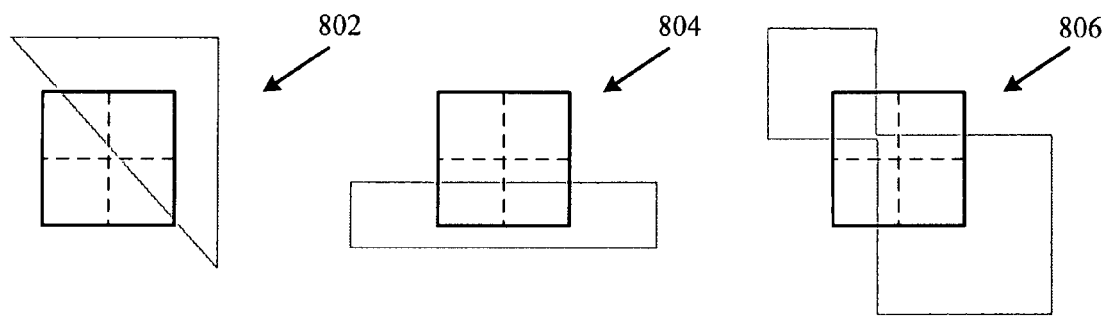

FIG. 8 shows examples of edges passing through a current macroblock. In the first case (802), a diagonal edge passes through the current macroblock. Since two blocks are edge blocks, the macroblock is tentatively marked as an edge macroblock. Since two directions from the current macroblock have edge angles, the current macroblock is designated as an edge macroblock.

In the second case (804), a horizontal edge passes through the current macroblock, which is tentatively marked as an edge macroblock. Since two directions from the current macroblock have edge angles, the current macroblock is designated as an edge macroblock.

In the third case (806), the current macroblock includes edges for corners of two shapes, which may be part of a larger pattern. Although the current macroblock is initially an edge macroblock, four directions from the current macroblock have edge angles, so the current macroblock is no longer flagged as an edge macroblock. Although the third case (806) might represent an intersection of smooth, sharp lines in the animation content, using a higher edge angle count threshold can result in an increased number of complex macroblocks being incorrectly flagged as edge macroblocks.

Alternatively, the encoder skips the additional screening or uses screening with a different filter or threshold count for number of edges angles (e.g., two).

2. Differentially Quantizing Detected Edges.

After the encoder identifies edge areas in the animation content, the encoder differentially quantizes the edge areas. In some embodiments, the encoder makes different adjustments for edge areas in I pictures than it does for edge areas in P pictures and B pictures. The encoder can also change how it makes adjustments depending on the spatial and/or temporal context of the edge areas.

For example, for edge areas in I pictures, the encoder sets a quantization step size to preserve significant non-zero AC coefficients. Lowering quantization step size for edge macroblocks allows for better edge quality by preserving the low-frequency AC coefficient that contribute to sharp gradients. In some implementations, the allowable values for QP are from 1 to 32. Edge macroblocks are quantized using the smallest allowable QP (by default, 1) when the picture QP is less than or equal to 3, and other macroblocks are quantized using the picture QP. When the picture QP is more than 3, edge macroblocks are quantized using the smallest allowable QP+2. If the range of allowable QP changes, the alternative edge macroblock QP changes accordingly.

As another example, suppose the encoder uses a texture-dependent differential quantization scheme for P pictures and B pictures. For quantization of edge areas, the encoder uses the highest allowable quantization step size less than the quantization step size for the picture, which improves edge quality. In some implementations, the encoder uses the maximum alternative QP for edge macroblocks, where the maximum alternative QP is lower than the picture QP.

Aside from adjusting quantization step size, the encoder can adjust DZ size depending on whether an area is an edge area, at least for quantization of AC coefficients. For example, for edge macroblocks, the encoder uses a narrower DZ than it does for non-edge macroblocks, which improves quality for the edge macroblocks. Using a narrower DZ tends to result in fewer values being quantized to zero, and it tends to cause fewer values to be quantized to the next lower quantization levels. Using a wider DZ pushes quantization bin threshold boundaries outward from zero, which tends to reduce quality and bit rate because more values are quantized to zero and more values are quantized to the next lower quantization levels. Changes to DZ size affect quantization but not reconstruction, and the DZ size changes are not signaled in the encoded video bit stream.

In addition, in some embodiments, the encoder adjusts differential quantization for edge areas depending on the spatial and/or temporal context of the edge areas. For example, if an edge macroblock has smooth macroblocks on its left and right, the edge macroblock more likely represents a sharp edge, and the QP for the macroblock is decreased. On the other hand, if the edge macroblock has textured macroblocks on its left and right, the QP for the macroblock is slightly increased since the texture tends to mask distortion. As another example, if an edge macroblock has no counterpart in the preceding picture or following picture, the edge is relatively transient and the QP for the macroblock can be slightly decreased.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a motion-compensated, block-transform video encoder, a computer-implemented method comprising:
designating an animation video for encoding as an animation content, rather than a natural video;
encoding the animation video differently than the natural video, wherein the encoding comprises:
detecting edges in the animation video using texture;
quantizing the animation video, including changing quantization settings of the video encoder to settings that are different than quantization settings for natural video for areas of the animation video that include the detected edges so as to improve encoding quality of the areas;
determining whether the animation content is an intra-coded animation content;
applying a different quantization approach for the intra-coded animation content than for animation content that is not intra-coded;
for the intra-coded animation content, identifying gradient areas with non-zero AC coefficients and adjusting quantization to preserve significant non-zero AC coefficients in some or all of the identified gradient areas, wherein the adjusting quantization includes reducing quantization step size for the gradient areas;
for animation content that is not intra-coded, performing aggressive differential quantization; and
outputting the encoded animation video in an encoded video bit stream.

2. The method of claim 1 wherein the detecting the edges includes creating a map of the edges in a picture of the animation video.

3. The method of claim 1 wherein the detecting the edges comprises:
classifying blocks depending on the texture in the blocks;
dilating preliminary edges resulting from the classifying so as to close gaps in the preliminary edges; and
eroding the dilated edges.

4. The method of claim 1 wherein the detecting the edges includes:
identifying plural blocks as edge blocks; and
identifying a current macroblock as an edge macroblock depending at least in part on the edge blocks and edge status of neighboring macroblocks.

5. The method of claim 4 wherein the edge status of the neighboring macroblocks is indicated at least in part by a count of edge angles among the neighboring macroblocks.

6. The method of claim 1 wherein the changing quantization settings includes narrowing dead zone size of a quantizer for the areas that include the detected edges.

7. The method of claim 1 wherein the changing quantization settings includes decreasing quantization step size for the areas that include the detected edges, compared to other areas of the animation video.

8. The method of claim 1 wherein the changing quantization settings includes reducing or disabling median filtering for the areas that include the detected edges.

9. The method of claim 1 wherein the areas that include detected edges are blocks or macroblocks in an I picture, P picture or B picture of the animation video.

10. A computer-implemented method comprising:
designating an animation video for encoding as an animation content through user input indicating that the animation video includes the animation content rather than natural video, including adjusting differential quantization rules to use for the animation video, the designation as animation video switching an encoder from first quantization settings for the natural video to second quantization settings for the animation video;

encoding the animation video, wherein the encoding comprises quantizing the animation video according to the adjusted differential quantization rules, wherein the encoding includes:

for an intra-coded animation content, identifying gradient areas with non-zero AC coefficients and adjusting quantization to preserve non-zero AC coefficients in some or all of the identified gradient areas, wherein the adjusting quantization includes reducing quantization step size for the gradient areas; and for animation content that is not intra-coded, performing differential quantization; and outputting the encoded animation video in an encoded video bit stream.

11. The method of claim 10 wherein the adjusting includes changing bit allocation rules for I pictures and other pictures of the animation video.

12. The method of claim 10 wherein the encoding comprises: Identifying the gradient areas; and adjusting quantization for the identified gradient areas to be less coarse.

13. The method of claim 10 wherein the encoding comprises identifying intra-coded areas that include at least one non-zero AC coefficient and decreasing quantization step size for the identified intra-coded areas to preserve one or more of the at least one non-zero AC coefficient.

14. The method of claim 13 wherein the identifying comprises finding blocks or sub-blocks of the gradient areas in I pictures.

15. The method of claim 10 wherein the encoding comprises:

identifying smooth areas and other areas; and performing aggressive differential quantization for the identified smooth areas relative to the other areas.

16. The method of claim 15 wherein the identifying comprises finding blocks of the smooth areas in P or B pictures, and wherein the aggressive differential quantization decreases quantization step size for macroblocks including the blocks of the smooth areas.

17. The method of claim 10 wherein the adjusting comprises modifying default differential quantization rules or switching from the default differential quantization rules to differential quantization rules adapted for animation content.

18. A system comprising:

an interface for exposing plural encoder settings for user selection, wherein the plural encoder settings include an animation mode setting, which is a different setting than a natural video mode setting; and a general-purpose video encoder including a motion compensation module implemented in a processor, a frequency transform module, a quantization module and an entropy encoding module, wherein the quantization module incorporates quantization rules adapted for animation content for use when the animation mode is selected, the quantization rules for applying a different quantization approach for an intra-coded and not intra-coded animation content, wherein for the intra-coded animation content the quantization rules include identifying gradient areas with non-zero AC coefficients and adjusting quantization by reducing quantization step size for the gradient areas to preserve significant non-zero AC coefficients in some or all of the identified gradient areas.

19. The system of claim 18 wherein the quantization rules adapted for animation content use different picture-by-picture bit allocations, aggressive texture-based differential quantization rules, edge detection and preservation.

20. The system of claim 18 wherein the quantization rules adapted for animation content include different rules for setting quantization step size, quantization dead zone size and/or median filtering, compared to default quantization rules.

* * * * *